Sept. 13, 1955  R. HOFGAARD  2,717,734
RELAY CALCULATING MACHINE
Filed July 25, 1951  9 Sheets-Sheet 1

Fig. 3.

Sept. 13, 1955 R. HOFGAARD 2,717,734
RELAY CALCULATING MACHINE
Filed July 25, 1951 9 Sheets-Sheet 4

Inventor:-
Rolf Hofgaard,
by Pierce, Scheffler + Parker,
Attorneys.

Fig. 6.

Sept. 13, 1955    R. HOFGAARD    2,717,734
RELAY CALCULATING MACHINE
Filed July 25, 1951    9 Sheets-Sheet 6

Inventor:-
Rolf Hofgaard,
by Pierce, Scheffler & Parker,
Attorneys.

Fig. 9.

$a \cdot b = c = R_1$ ;  $d + c = R_2$ ;  $e \div c = R_3$,  $c + f = R_4$ $a = 276,53$     $d = 1244799,23$
$b = 4368$       $e = 2176988,96$     $f = 214,25$

| | | | |
|---|---|---|---|
| T1 | 276,53 × 4368 | T4 | 1880404<br>1189079 |
| T2 | 15442<br>14331<br>2110  Tiere<br>2221 | T5 | 120788304  c<br>124479923  d<br>217698896  e<br><br>214,25 · 1  c+f |
| T3 | 221224<br>165918<br>82959   a.b.<br>110612 | T6 | 2452 8227   d+c<br>9691 0592   e÷c<br>1208 09729  c+f<br><br>R1 = 1207883.04 |

T7   R4 = 1208097.29
     R2 = 2452682.27
     R3 =  969105.92

Sept. 13, 1955   R. HOFGAARD   2,717,734
RELAY CALCULATING MACHINE
Filed July 25, 1951   9 Sheets-Sheet 8

Fig. 10a.

Sept. 13, 1955   R. HOFGAARD   2,717,734
RELAY CALCULATING MACHINE
Filed July 25, 1951   9 Sheets-Sheet 9

Fig. 10b.

United States Patent Office 2,717,734
Patented Sept. 13, 1955

2,717,734

RELAY CALCULATING MACHINE

Rolf Hofgaard, Oslo, Norway

Application July 25, 1951, Serial No. 238,487

Claims priority, application Norway August 16, 1950

3 Claims. (Cl. 235—61)

The present invention relates to calculating machines operated through relays in which is applied a new and improved method for realizing a principle, which is well known per se, and according to which a multiplication, subtraction or addition operation is carried out directly through the closing of contacts controlled by electromagnetic relays in such manner that the closing of contacts is either brought about directly by the relays or by a secondary source of energy, e. g. from a motor under control of the magnets.

Thus the principle is previously known according to which the closing of a circuit to one magnet out of a unit of ten magnets will connect ten supply leads to ten operating leads according to the addition table, the subtraction or multiplication table respectively, United States Patents Nos. 1,876,293, 1,987,294, 1,876,295 and 1,876,296. It is the same underlying principle when, instead of ten magnets, only five relays are being used, which directly represent the numerical values 1–5, while values from 6–9 result from the adding of 1 to 5, 2 to 5, 3 to 5 and 4 to 5, the quinary system.

It is also previously known to carry out calculating operations by means of a combination of code units in order to accumulate the values 1 to 9. In this may be included systems where the binary system is employed in the shape of the code 1. 2. 4. 8., United States Patent No. 2,191,567. Dependent upon the binary system are also relay machines using relays of the kind whereby the closing of a circuit is serving the purpose of connecting a series of contacts, while a subsequent closing of the circuit for same relay will break off said series of contacts, as in United States Patent No. 2,364,540.

Finally will be mentioned an embodiment based upon code values, the digit inserted closing the circuit to a combination of magnets corresponding to the code values. Across said combination of magnets the digit is transferred to leads representing the digits 0–9, and now again the digit is transferred across a second combination of result-relays into the code form in which the result is to be expressed, United States Patent No. 2,449,228.

The present invention does not apply directly any of the known principles mentioned above, but has its main features in the fact that for the calculating operation, relays are provided for a separate handling of the even digits 0. 2. 4. 6. 8. as well as for the odd additional value in the number. In its most pure form, a set of leads corresponding to the even digits 0. 2. 4. 6. 8. will be carried across a set of relays corresponding to said values, while the odd additional value is handled across special contacts in connection with the relay for the value 1 and the transfer-relay.

The preferred embodiment based upon said principle, and which is to be described below, applies valves and condensers, whereby the number of relays can be reduced to four special relays and one transfer-relay. Thus there will be three special relays for the handling of the even digits, one special relay in connection with valves and condensers for handling the odd supplement as well as one transfer-relay. It will also be immediately realized by people skilled in the art that instead of valves also multi-coil relays, if so preferred, can be used.

According to the present invention the result is brought out and accumulated in the code form 1. 2. 4. 6. As already stated, the adding operation depends on the code 0. 1. 2. 4. 6. 8. The adapted relays for addition represent the code values 1. 2. 4. 6., but any combination of three relays representing even numbers which sum is not less than eight could be used.

It is the object of the invention to reduce the number of relays to a minimum as well as to obtain a very considerable speed in carrying out the various mathematical computations. Because these computations mainly have for their objects the ordinary calculations to be handled within the scope of the conventional type of accountancy, special attention has been given to a speedy multiplication as well as to speed in ordinary balancing operations.

These and other features of the invention will be set forth in the specification below with reference to the accompanying drawing, which by way of example, illustrates one embodiment of the invention.

On the drawing:

Fig. 1b shows schematically a perspective view of the device shown in Fig. 1a.

Figure 1A:
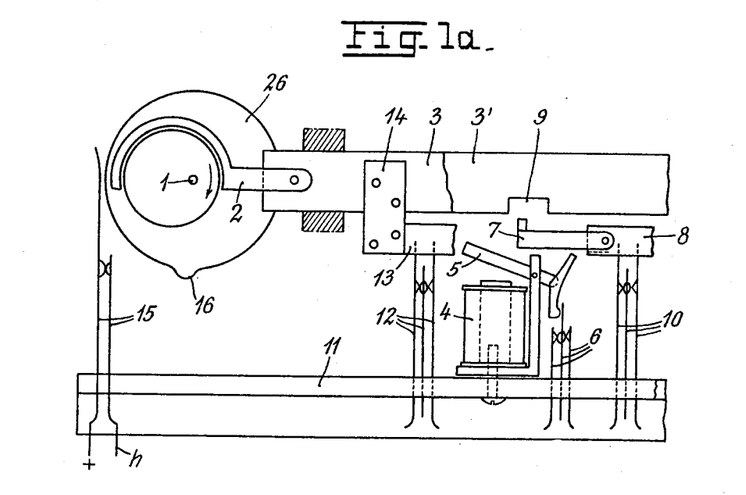
Fig. 1a shows a relay also in connection with a multiple contact switch set of the type employed, where the contact set is closed and broken respectively by energy supplied from a motor.
Figure 1B:
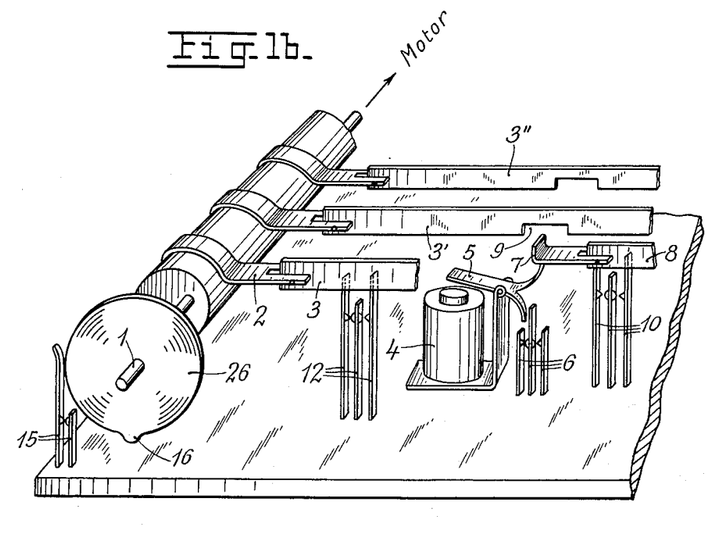

The shaft 1, see Figs. 1a and 1b, are driven by a motor, not shown, and carries an eccentric 1a which operates through pivoted arms 2 to transform the rotation of eccentric 1a into a synchronized reciprocating movement of a set of bars 3, 3', which are horizontally supported in bearings and displaceable longitudinally. The arrangement of the different parts will appear from the schematical view in Fig. 1b, where only the parts seen in Fig. 1a are redrawn in connection with their co-operating means.

Immediately underneath each of said bars a number of magnets are provided, each of them being arranged to operate a multiple contact switch set in such a manner that upon the coils 4 attracting the armature 5, it will, besides in the conventional manner directly actuating a number of spring contacts 6, also lift the hook 7, which is supported in the multiple contact switch set 8, appertaining to the magnet in question in such a manner that the hook 7 engages a notch 9 provided in the bar 3', when this is moving in its left hand extreme position, whereby the said switch-operating bar 8 will follow the movement of the bar 3'. If the hook 7 is lifted prior to a possible engagement of the hook 7 into the notch 9, the hook will slide on the lower surface of the bar 3', and even though the switch-operating bar 8 is not engaged, the movement of the armature is sufficient for the circuit operation of the springs 6. On the other hand, the multiple contact switch set 8 must follow the movement of the bar 3' as long as the coil 4 is supplied with current and at least one reciprocating movement of the bar 3 itself, even if the current should be broken before the bar has completed the full length of its movement. This breaking off of the current will have as its only effect that the armature falls back into position owing to the pressure caused by the directly operating springs 6, which thereby, in turn, are broken off, while the hook does not slip down until the pressure thereon has ceased during the backward movement of the bar, said pressure being absorbed by the counterpressure actuated by the centrally positioned springs against the switch contacts.

The set of spring blades 12 form a multiple contact switch set 13, which is not controlled by a magnet, but by the bar 3 by means of the plate 14 secured to said bar and movable therewith. The top end pieces, of which only the fragments 8 and 13 are shown in Fig. 1, are evidently made of an insulating material. The same applies to the bottom plate 11 to which all the spring contact blades of the switches are fastened. The magnets are also mounted on same plate. At left in Fig. 1 is illustrated a switch contact set 15 secured to the bottom plate 11, while a knob 16 provided on a disc of fibrous material 26 is controlling the contacting operations for the spring 15 in a predetermined action relatively to that of the multiple contact switch set. The movements of the multiple contact switch set which is moved by the same eccentric roller will all be synchronized and the producing of a phase displacement between the movement of these contact sets as against others which are controlled by means of another eccentric roller, will be easily obtained. By this means different contact closing conditions may be created. A few of these have been shown on the diagram, Fig. 2.

Figure 2:
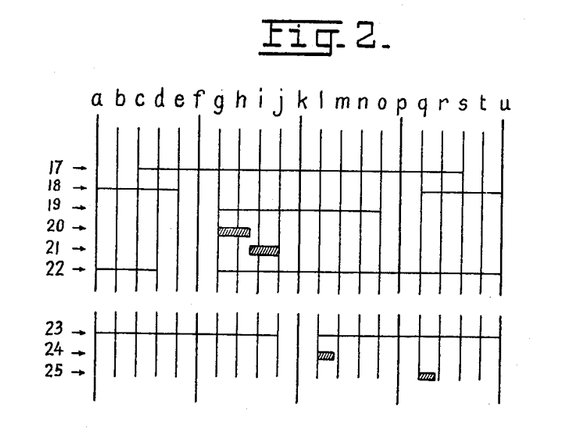
Fig. 2 illustrates by way of a diagram different timeintervals for closing and breaking of the circuit during the reciprocation of the bars.

Here the movement of one multiple contact switch set is divided into twenty equally large time intervals by means of vertical lines $a-u$. The horizontally drawn lines 17–25 give the time in which the contacts are closed. The line 17 $c-k$ illustrates the movement of one multiple contact switch in the right hand direction, and the line $k-s$ the backward movement of same set. Line 18 $a-e$ gives the time in which the switch contact of the set is kept in closed position during the movement in the right hand direction of the bar 3, and line 18 $q-u$ the same closing of contact during the movement of the bar in the left hand direction. The closing contact is kept closed during an equally long period of time, namely as indicated by line 19 $g-o$. The contact times 18 and 19 are the same whether the set is controlled by a magnet or fixed to the bar. The heavy short lines 20, 21 indicate the time needed for a relay armature to be attracted by the core of the coil. 20 indicates the reaction time of an armature, the coil of which is closed by the contact 19, and 21 the reaction time of another magnet, the circuit of which is closed by an armature contact in connection with the first mentioned magnet. Line 22 $a-d$ and $g-u$ indicates the time in which the switch contact 15 is closed while the time-interval $d-g$ is the period, determined by the rotation of the fibrous knob 16 during which the connection to the lead $h$ for holding circuit current is broken for the relays concerned.

Line 23 indicates a closing of contact in connection with a multiple contact switch set, the movement of which has been brought out of phase relatively to those mentioned above. In addition the set is directly controlled by the bar 3. 23 $a-f$ indicates the time in which the closing contact is closed during the movement of the bar in the right hand direction, while 23 $f-j$ is the closing time of same contact during the movement of the bar towards the left. Thus $f$ indicates the right hand turning point of the direction of the movement. 23 $l-p$ is the time during which the switch contacts belonging to the same set are being closed during the movement towards left of the bar, while 23 $p-u$ is the time during which the same contacts are being kept closed during the right hand movement of the bar. Thus $p$ is the left hand turning point of the direction of the movement. Thereby the phase displacement will amount to 90°. The contact closing time 23 $a-j$ may be used for charging a condenser from an energy source of high voltage. The discharge may take place across the switch contact belonging to the same set of springs. In case the discharge should be effected across a coil, the reaction time of the armature, on account of the high voltage, will not exceed the length of the heavily drawn line indicated at 24. If the discharge current is led across a switch contact timed as indicated at 18, the discharge will be delayed and take place as indicated by the tempo line 25.

On the wiring diagrams, Figs. 3–6, the movable blade contact of a switch is indicated as a short, heavy line, the front contact is shown as a black dot situated to the left and the back contact is shown as a small circle or open dot at the right of the central blade contact. Sets of contacts between same parallelly extending lines belong to the same multiple contact switch set.

Figure 3:
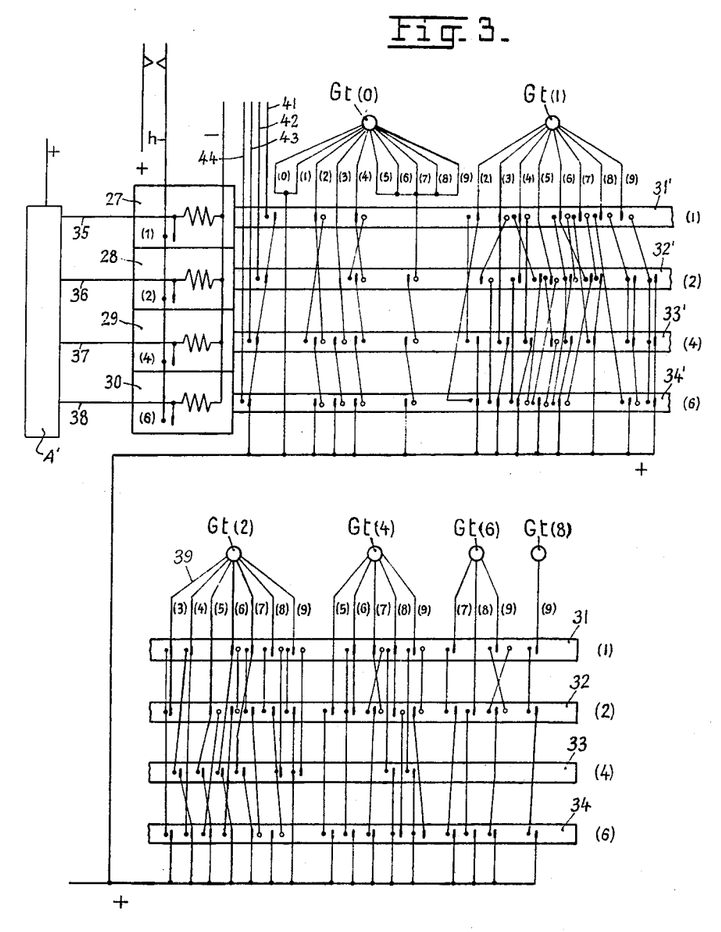
Fig. 3 shows four relays for one digit in the multiplicator with passage of a circuit for each of the ten-values in a "partial product."

Fig. 3 is, as it will appear, shown divided, i. e. the lower part continues to the right of the upper part. In this figure numerals 27—30 indicate four relays with appertaining multiple contact switch set, 31'—34' and 31—34, these sets divided as just explained. The relays 27—30 are as there will be evident schematically drawn up. These relays correspond to the magnet 4 in Figs. 1$a$ and 1$b$ with the armature contact set 6 arranged in a frame to the left such as the schematical illustration of the relays 27—30 in Fig. 3 shows. To the right for this frame is between double lines the contacts belonging to the contact set for the respective magnet indicated. The numerical values corresponding to relays multiple contact switch set and leads have been put in brackets. The leads + and + have been directly connected to the poles of a low-voltage energy source, without indicating said source on the drawing.

Figure 5:
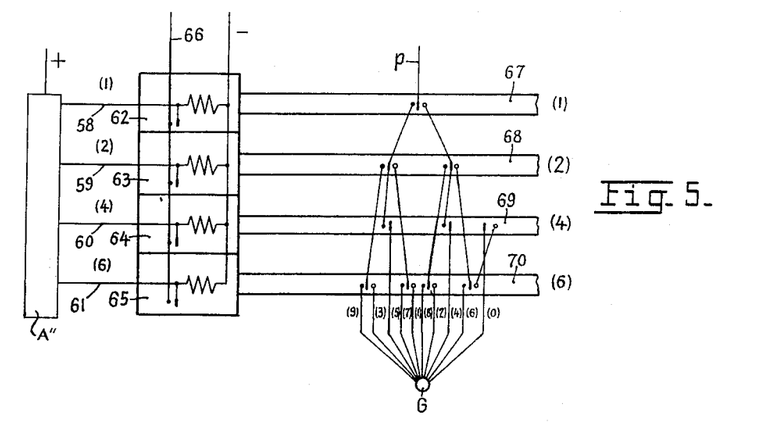
Fig. 5 shows four relays for one digit in the multiplicand, where only one passage for the digits 1–9 have been drawn up.

The boxes A' and A", Figs. 3 and 5, respectively, indicate keyboards for selectively connecting the leads of the code relays to the source of current in accordance with the value (digits) to be entered in the machine. Mechanical constructions for such keyboard-switch assemblies are well known, and the particular construction which may be employed forms no part of the present invention.

By means of the keys in the box A', the multiplicator of a desired value is transferred to the multiplicator relays by connecting the positive terminal (+) of a source of current with one or more of the leads 35—38 of the relays 27—30, see Fig. 3. In the same way, the keyboard in box A" is used to transfer the desired multiplicand to the multiplicand relays 62/65 via the leads 58—61, Fig. 5.

Figure 6:
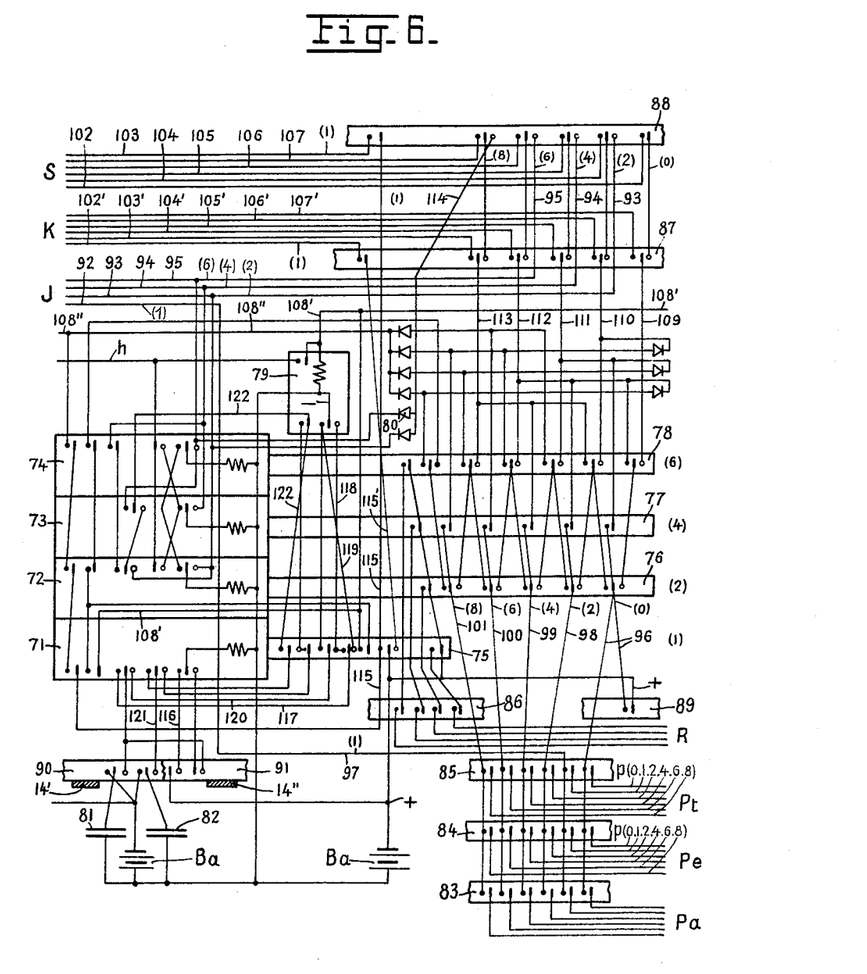
Fig. 6 is a complete diagram for adding operation with the use of valves and condensers.

By means of the network of leads connected to the contact sets relating to these relays, the contacts being of the type described as contact set 8 in connection with Fig. 1, the circuits corresponding to the different partial products are closed according to a system known per se and described for instance in connection with Fig. 6 of Patent No. 2,191,567.

It should be stated that the current circuits via the relay contact sets 31—34, Fig. 3, close the leads in groups each being transferred via a coupling shown in Fig. 5 by the relay contact sets 67—70 for the multiplicand and represents the tens value of the partial product. The units value is provided according to the same system by means of the sets 49—52, Fig. 4, appurtenant the relays 45—48. These relays are closed directly from the multiplicator relays 27—30 by means of the leads 41—44, and, therefore, are also multiplicator relays which in practice only may be indirectly or secondary closed by means of the keys in the box A', Fig. 3.

The embodiment here shown for carrying out a multiplication (that means a method for providing partial products), is described to show how the connection according to Fig. 6 for addition also easily could be used in connection with multiplication. The multiplication in itself is not necessary in connection with the present case.

As mentioned in the introduction the idea of the invention is to use as few relays as possible, which is obtained by only using three relays for the treatment of the even numbers, the code value used for the relays only being fixed for the code unit 2 and the code unit 4. The code for the third relay may be an arbitrary chosen even number. For the embodiment chosen the code unit 6 is used as the third code unit.

The coils of the relays 27—30 receive current impulses from the machine keyboard A', Fig. 3 by the code leads 35—38 according to the numerical value to be entered. The magnets get their holding current during time intervals 22 $a$–$d$ and 22 $g$–$u$, Fig. 2, by the lead $h$.

Fig. 3 shows a number of current circuits across the multiple contact switch set 31'—34' for various combinations of closed and interrupted sets corresponding to the digits 1–9 having one digit in the multiplicator. For each current circuit the numerical value is placed in brackets on the out-going lead, G$t$(0), G$t$(1), etc.—G$t$(8), corresponding to the numerical value of the multiplicand resulting in current circuits across the multiple contact switch set, Fig. 5 of the multiplicand for the leads in question.

In a similar manner the current circuits from + lead across the switch sets 31—34 have also been drawn up. Each current circuit has been drawn up across each individual multiple contact switch set in order to show the wiring principle. It will therefore appear that several of the contacts and current passages are connected in parallel. The outgoing leads fall into groups which, for example, may be connected to junction boxes as G$t$(0), G$t$(1), G$t$(2), G$t$(4), G$t$(6), G$t$(8). The suffix —$t$— indicates that the group is belonging to the ten-value in a "partial product." The code value is added in brackets. As for example, the lead marked 3 in the group G$t$(2) will be connected to the + lead whenever the multiplicator has the values 7. 8. 9. To the multiplicand value 3 the partial products, "21," "24" and "27" will result. All of them contain the code value 2 for the ten-value. This feature characterizes all the leads in the group G$t$(2). The + lead is also closed across each of the multiple contact switch sets 31'—34' with the leads 41—44, which supply direct impulses to the relays 45—48, Fig. 4, whereby said figure is drawn in the same manner as Fig. 3, i. e. the relays 45—48 are drawn in the same schematical manner as the relays 27—30 to represent a magnet 4 which directly actuates a set of switch contacts 6 and controls the actuation of a switch-operating bar 8, the switch-operating bars being here identified by reference numerals 49 to 52, respectively.

Figure 4:
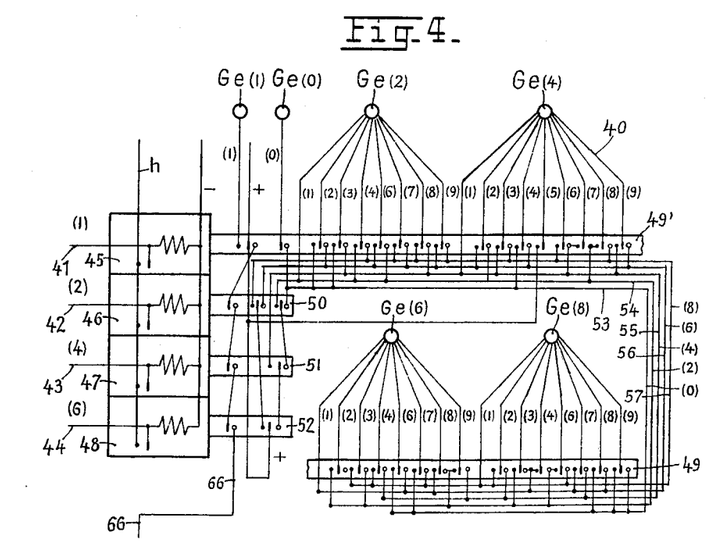
Fig. 4 shows four relays for one digit in the multiplicator with passage of a circuit for each of the values of the ones in a "partial product."

Across the multiple contact switch sets 49—52, Fig. 4, the + lead is connected to different lead groups which separately may be gathered to their own junction boxes such as G$e$(0), G$e$(1), G$e$(2), G$e$(4), G$e$(6) and G$e$(8). The suffix —$e$— represents the unit number in the same "partial product" resulting as mentioned above. The numerical value has been added in parentheses. Due to the fact that all the current circuits across the multiple contact switch set 50—52 will be parallel, only one passage has been indicated in order to connect the + lead to the leads 53—57. These leads 53—57 represent the values 0. 2. 4. 6. 8., respectively. These leads 53—57 are in turn across contacts in the relay set 49', 49, connected to leads leading to the different G$e$ groups. The outgoing leads such as 40 are marked with the numerical value of the multiplicand resulting in current circuit across the multiple contact switch set on the multiplicand relays.

Across the leads 58—61, Fig. 5, the multiplicand relays 62—65 are illustrated as already mentioned in connection with the Figs. 3 and 4. These relays are receiving direct current impulses from the keyboard A', Fig. 3. Across the lead 66 holding circuit for the relays is closed across a series of contacts on the multiple contact switch set 49—52, Fig. 4. The numerical value represented by the multiple contact switch sets 67—70, namely the code values 1. 2. 4. 6., have been added in brackets. Across these sets all the leads from the multiplicator multiple contact switch sets are carried in groups G. In Fig. 5 the relays 62—65 might be energized by the keyboard from the box A" over the leads 58—61. Over the multiple contact switch sets 67—70 only one arbitrary group G has been indicated, but it will be understood that the wiring for each group comprising the lead values from 0 to 9, conditions are as shown by way of the illustration given in Fig. 5. The individual leads of each group are gathered in a lead $p$, belonging thereto, the value of which represents a code unit for the ones and tens in a "partial product," in accordance with the code 0. 1. 2. 4. 6. 8. The hereto corresponding leads $p0$, $p1$, $p2$, $p4$, $p6$, $p8$, will express a partial product indicated by P. If the leads corresponding to the code value of a partial product are indicated by P the group indications P$t$ and P$e$ thus comprise leads representing the ten-value and the one-value respectively in a "partial product," going out from the multiple contact switch sets 67—70, and which are not shown in Fig. 5.

Fig. 6 shows a wiring method for an addition set. This set comprises four relays 71—74 with appertaining multiple contact switch sets 75—78 as well as a magnet 79 having only armature contacts. Besides, valves are used as indicated at 80, as well as two condensers 81, 82, which preferably may be charged from a special high voltage energy source B$a$. Besides the addition set proper, there have also been shown several group contact relays in Fig. 6 for the connection of lead groups to or from the addition set. The multiple contact switch sets 83—88 have been shown only in fragments, because across the same sets may also be carried lead groups to or from other addition sets representing other digits. Across the multiple contact switch set 89, the positive terminal (+) of the current source is connected to supply leads representing the code unit 0 for a number of addition sets.

The multiple contact switch sets 90 and 91 are not magnet controlled but connected to the reciprocating bars 3, see Figs. 1$a$ and 1$b$, by the riveting plates 14', 14". The set 90 is brought out of phase relatively to the movement of the set 91, the contact tempo 23, Fig. 2, is applied to the set 90 while set 91 has a movement which is synchronized with the remaining sets, tempo 18, 19, Fig. 2.

The leads 92—95 forming the lead group J and representing the code values 1. 2. 4. 6. are carried across armature controlled contacts provided on the corresponding coils on the addition set. The contacts have been adjusted in such a manner that the movement of the armature will be sufficient to enable the holding circuit to hold the armature continuously. The leads 92—95 connect directly to the addition relays 71—74. The lead group R from the multiple contact switch set 86 are outgoing leads representing the code values 1. 2. 4. 6. and indicating the result, which may be recorded through the addition relays as soon as the contact set 86 has been closed. By the lead groups P$t$ and P$e$ from the multiplier unit, Fig. 5, the ten-value of a "partial product" is carried across the set 85 and the unit-value across the set 84 to the supply leads 96—101 to the multiple contacts of the addition sets. The group P$a$ is representing a special group, which is also connected to the leads 96—101 across the multiple contact switch set 83. The group S and K comprising the leads 102—107 and 102'—107' are outgoing leads representing the values 0. 1. 2. 4. 6. 8. The group S is representing a real sum, while the group K represents the complementary value of the same. In Fig. 6 the same lead indication is applied for the same code unit. It will be evident that the code value 1 in the complementary number will result whenever the multiple contact switch set 75 is interrupted.

The supply leads 96, 98, 99, 100, 101, representing the even digits from 0 to 8 are carried across the addition sets, either unchanged in value or increased in value in accordance with the code 2. 4. 6. 8. according to the closure of the corresponding relay units. Digit 8 demands a simultaneous closing of the relay units 76 and 78. In case the value 9 is exceeded the lead in question is connected to lead 108″ across a valve indicated at left in Fig. 6, while the lead across the valve at right, is connected to one of the leads 109—113 for the values 0. 2. 4. 6. 8. Across the contacts in the units 87, 88 the leads 110, 111, 112 are connected to the leads 93, 94, 95 as well as to the coils of the respective relays 72, 73, 74. The lead 113 is across contacts in these same multiple contact switch sets 87, 88 connected to the lead 114, representing the value 8 and being connected to the leads 93 and 95 across valves like the one indicated at 80.

The supply lead 97, representing one is directly carried to the coil of a relay 71 like lead 92 in the group J. Upon closing one of the multiple contact switch sets 87 or 88 the lead connections to the addition relays Fig. 6 are interrupted, but connection with other addition sets through the lead group K or S can be maintained. The leads 103, 103′, representing the value one in the group, will appear to be connected directly from + across the relay set 75 and across the lead 115 when the set is closed, and across the lead 115′ for the complementary value across the set 87 whenever the set 75 is interrupted.

In an ordinary adding operation none of the multiple contact switch sets 87, 88 are closed, and the relay 71 will be fed across the lead 97, across one of the sets 83, 84 or 85 as long as one of these sets is closed. The holding circuit of the relay from lead 116 is, during the same time interval, interrupted across the contact in the multiple contact switch set 91. The condenser 81 has been charged across the closing contact in the set 90, tempo 23 Fig. 2 from the battery Ba. Therefore, when one of the sets 83—85 in addition to 91 is slipping back, the lead 97 is interrupted prior to the closing of the holding circuit across the lead 116. Relay 71 therefore, will be without current at the same time since the set 75 has already slipped back. Consequently the condenser 81 is discharged across the contact in the set 90 and the contact in the set 91 as well as across a closed armature contact in relay 71, which is without current. Thereby relay 71 receives an impulse, tempo 25, Fig. 2 and is kept energized by means of holding circuit across the lead 116. The relay will therefore have a current supply until the set is closed and the digit 1 has been recorded.

In case the set 75 was closed when the relay 71 received current across the lead 97, it will appear that the discharge of the condenser will take place across the closing contact in relay 71, lead 117, the closing contact in set 75, the lead 118 and directly to the negative source terminal across the armature contact in relay 79, tempo 24, Fig. 2. When therefore the sets 75 and 91 slip back, the condenser is already discharged, and relay 71 will remain without current supply. Digit 1 is not recorded.

In case relay 79 is having current supply, lead 108′ being closed in connection with preceding cipher in the manner described relatively to lead 108″, discharge across lead 118 will not take place. To the contrary, the condenser will be discharged across lead 119, in case set 75 is not closed.

If relay 79 without current supply across lead 97 is closed, the condenser 81 will be discharged across lead 120 only in case the set 75 is closed, and the discharge will not take place unless relay 79 is without power supply, too. Thus an addition resulting in an even numerical number will cause an interruption of current to relay 71, while relay 71 will register digit 1 in case the sum is an odd number.

Similarly, it will appear from the wiring diagram, Fig. 6. that a possible discharge of condenser 82 which is being charged simultaneously with 81, can only take place according to tempo 24, Fig. 2, if more than one one is to be registered simultaneously. For instance, two odd numbers are to be added, no matter whether at the same time also a transfer is to be registered by supplying current to relay 79, or whether the transfer occurs when an odd figure is registered or is to be added to make a sum. In all cases the discharge operation will take place across lead 121 and 122.

A discharge across the lead 122 will give impulse to relay 72 in case no relay had been closed during the adding operations. If, on the other hand relay 72 has already current supply, according to tempo 20, Fig. 2, it will appear that the discharging impulse will take place across the coil belonging to relay 73, and if the latter relay has current supply, the coil belonging to relay 74 will receive the impulse, and in case relay 74 receives current, the impulse will be directed to the coil belonging to relay 72. It will appear that lead $h$, supplying the relays 72, 73, and 74 with holding circuit, tempo 22, Fig. 2, will be interrupted as far as the already closed relay is concerned, which will be deenergized as soon as a relay of higher value is energized. In this manner the value 2 will be added in tempo 24, Fig. 2, indifferently whether the transfer relay, once in a while, does not receive current supply until tempo 21, Fig. 2. This will occur when, for instance, the relays 71, 72, 74 and relay 79 are closed in tempo 20. In that case lead 108″ is also closed across relay 71, 72 and 74 as well as through the top valve at left on lead 108″, which is supplying current to the next transfer relay, and across the latter in the same manner and in the same tempo to all the units where value 9 has been registered, so that all these units register transfer in tempo 21, Fig. 2. Similarly it will be possible to connect the positive source terminal to lead 115 in case lead 108′, for instance, is having no power supply, across relay 71, 72 and 74 and directly to lead 108″, which in that case will supply transfer current in the same manner and same tempo as already described in connection with lead 108′, even if lead 108′ has no direct current.

Figure 9:
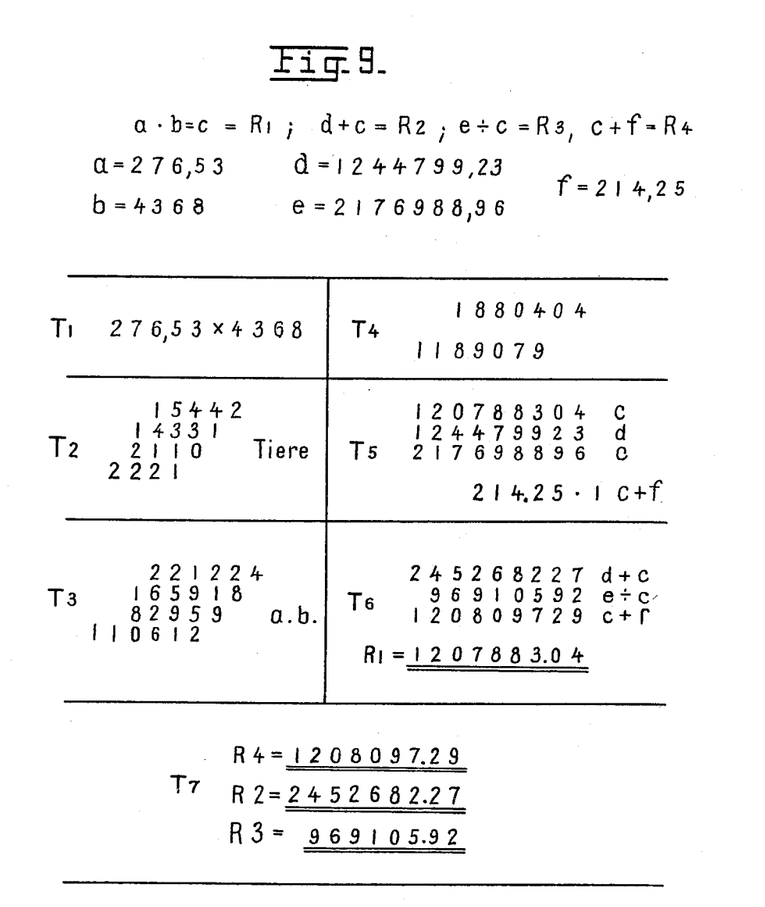
Fig. 9 presents one example of a calculating operation.

In the same tempo where this transfer takes place across all succeeding ciphers with relays having power supply corresponding to Figure 9, a discharge also of the condenser 82 will take place across lead 121, 122, switch in relay 73 and closing devices in relays 72 and 74 across coil 73, the armature of which, for this reason will be actuated. The relays 72—74 are being closed momentarily, but hereby the holding circuit to all these three relays will be interrupted with the result that said relays will be deenergized so that a 0 will be recorded.

Because of the fact that lead $h$ of the holding circuit will be broken in each tempo, it will be necessary always to insert a 0 or a number in each tempo in order not to interrupt the addition process. It is therefore advisable that the operation series to be performed are arranged on beforehand.

Because all addition units are alike, it is possible to determine the contact switch sets to be operated together at will by interconnecting multiple contact switch sets similar to the sets 83—85, across which are carried the groups of supply leads. In that case it is presupposed that leads like 108′ and 108″ are carried across closing contacts in the same multiple contact switch set.

In order to give an illustration of the working operations of the machine a series of operations will, by way of example be described below, in connection with a machine consisting of 27 unit devices for addition having wire connections as indicated in Fig. 6 as far as one single digit is concerned, together with four multiplicator units interconnected for the ten-values in a "partial product" according to Fig. 4 as well as four units interconnected according to the one-values of the "partial product."

Figure 7:
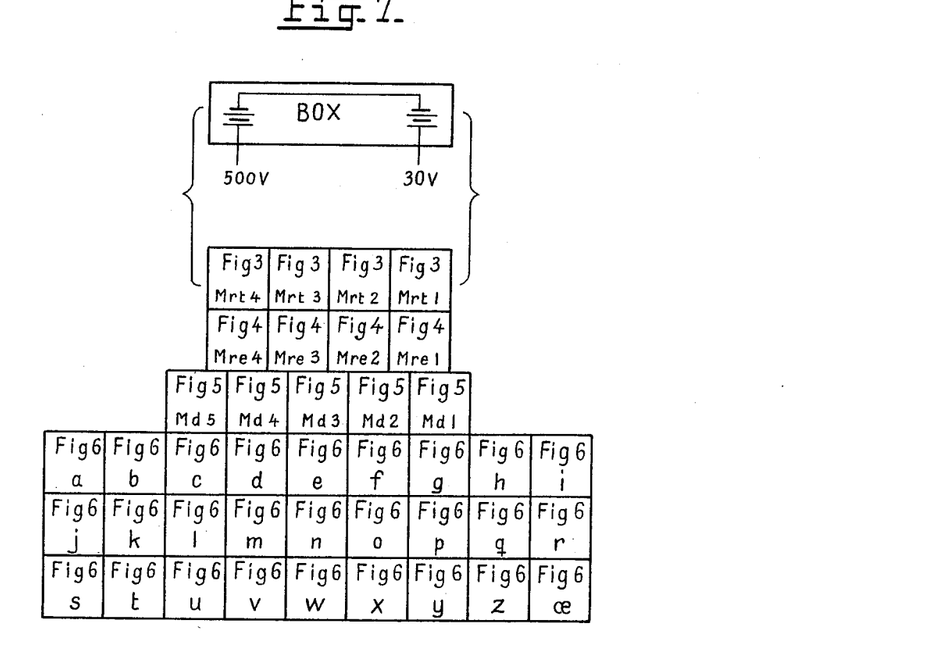
Fig. 7 shows diagrammatically how a relay calculating machine can be laid out.

Fig. 7 shows a diagrammatical illustration of the machine specified above. At the top of the Fig. 7 is seen a rectangle called "BOX," which besides the two power sources contains various devices such as printing—and perforating machinery or magnetic tape and the like. These devices will not be described in detail as they are no part of the present invention. For the sake of simplicity and clarity it is presupposed that the impulses of the results supplied from the addition devices through the lead groups R, see Fig. 6, are carried on to a set of condensers to be accumulated there temporarily, and from which, later on, they can be transferred to, for example, a perforating device. The power source for the lead group R should, in that case, be connected to the high voltage power supply. In order to make possible a great number of impulses to be given simultaneously, a perforated sheet material may be used. Now the contact brushes will connect different lead groups, as for example the leads 35—38, Fig. 3, and 58—61, Fig. 5 for a simultaneous input to the respective relays.

Figure 8:
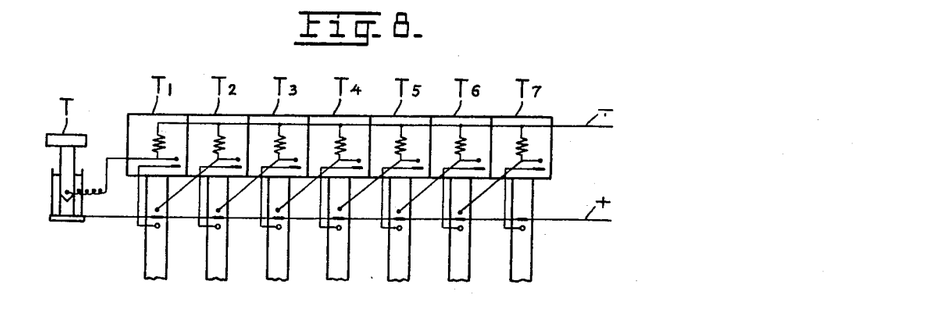
Fig. 8 shows as example relays for tabulating various impulses for a preselected sequence of operations.

The multiple contact switch sets are connected across a system of tempo-relays T1—T7, Fig. 8. Relay T1 is closed by pressing the key T down, whereby the relays T1—T7 will be successively closed according to the timing cycle, each in its turn. Upon this the impulses according to the pre-determined operation series will be transferred from "BOX" to the various groups of relays, the multiple contact switch sets of the T-relays closing lead groups similarly to the sets 83—89, Fig. 6.

Below an operation series will be summarized comprising one multiplication and three balancing processes in connection with a diagram, Fig. 9, and the illustration given in Figs. 10a and 10b.

The relay unit device for the multiplicand is designated $Md$, the multiplicator unit device $Mre$ for the units and $Mrt$ for the tenth. The figures added designate the increasing values from the lowest unit—Figs. 7 and 10a. The 27 addition units are designated A ($a$–$ae$). The values are given in each tempo by the figures added whereby the number 1 indicates the lowest cipher value.

Figure 10A:
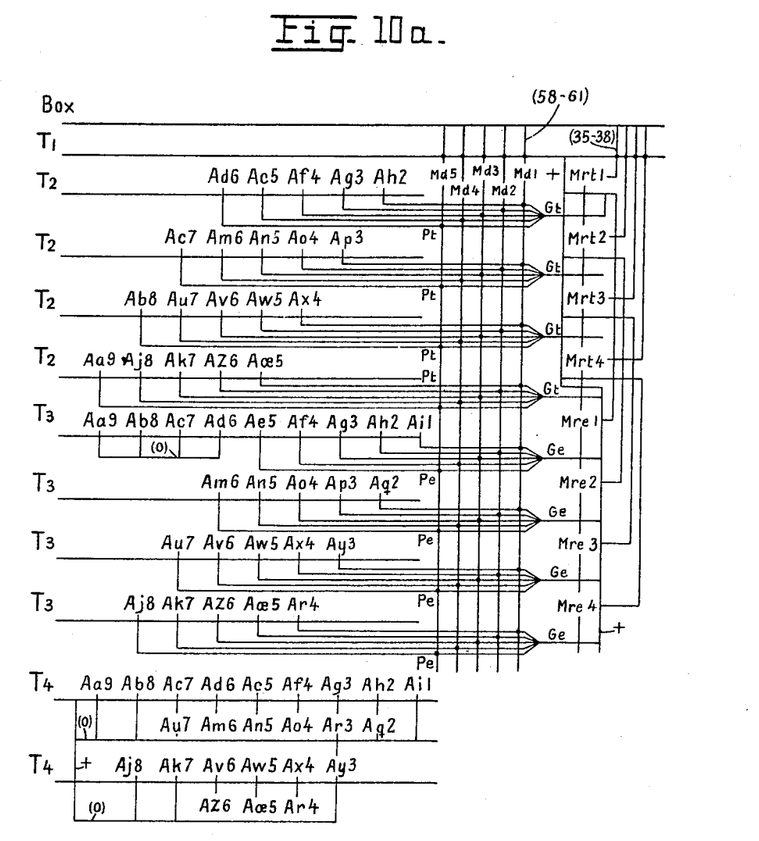
Figs. 10a and 10b are simplified diagrams of the sequence of impulses effected in the calculating example chosen and illustrated in Fig. 9.

The top line in Fig. 10a indicates the box in Fig. 7, from where lead groups like 35—38, Fig. 3, and 58—61, Fig. 5, which are connected across the multiple contact switch set for relay T1, that is to say, in the first tempo for the respective $Md$ and $Mr$ relays which is indicated by a point in Fig. 10a, in the intersection point on the next line T1 of the lines for the respective relay sets.

The multiple contact switch set therefore is closed in the second tempo, and is across the $Mrt$ and $Md$ sets, across set T2 connected to the respective addition devices. In the setting-up of the arrangement attention has been paid to the conventional method of multiplication, for which reason the transferring to the addition devices of the various $Pt$ lead groups, Fig. 6, can be directly read from the drawing, Figs. 10a and b. In the second tempo the ten-values are led in to the addition devices A. At the same time the $Mre$ relays are closed.

In tempo three the one-values are transferred across the multiple contact switch set T3. At the same time the $Md$ relays are without power supply by the interruption of the holding circuit 66, see Figs. 4 and 5.

In tempo four different addition units are connected, the multiple contact switch set of relay T4 consisting of sets like 88, Fig. 6. Sets like 89 connect 0 or lead like 96 to the following addition devices: $Aa9$, $Ab8$, $Aj8$, $Ak7$, $Au7$, $Am6$, $An5$, $Ao4$, $Ap3$, $Aq2$, $Az6$, $Ar4$. The values registered in the sets are by T4 transferred to the corresponding sets according to Fig. 10a, where they are added, upon which those sets from which an adding has taken place, will be without power supply.

Figure 10B:
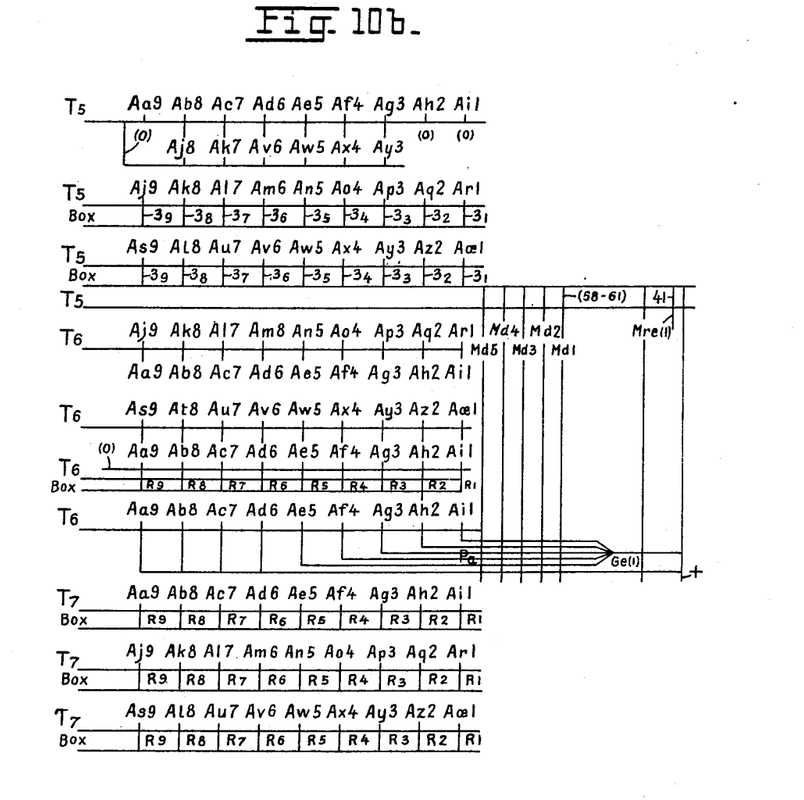

In tempo five is, in the same manner transferred across T5, Fig. 10b, what has been registered in the multiple contact switch sets: $Aj8$, $Ak7$, $Av6$, $Aw5$, $Ax4$, $Ay3$ to the sets indicated at the top of Fig. 10b, where they are summed up. Simultaneously from the box Fig. 7, are transferred two ciphers in the code from 1. 2. 4. 6. across the second and third line T5 as from above, in the shape of lead groups J. In addition, a figure is inserted from the box across T5 to the $Md$ relay sets, while at the same time, relay 1 for the first cipher corresponding to lead 41 is supplied with power, Fig. 4.

In tempo six is transferred from the addition units $Aa$—$Ai$ the product which has been registered in said units to the sets indicated above the line, by sets like 88, Fig. 6, while the complementary value of the product is transferred by sets like 87 across the following T6 set. The transfer relay is closed in the multiple contact switch set $Ai1$, which gives the complementary value 10— the number while the complementary values of the other ciphers will appear as 9— the number. The third line T6 is constituted by sets like 86, whereby the product is transferred to the box, lead group R. The fourth line T6 will transfer the number inserted into the $Md$ relays multiplied by 1 across sets like 83, lead group $Pa$, into the addition units $Ae$—$Ai$. In the remaining units $Aa$—$Ad$ 0 is inserted. By this means the figure is added to the product in the register $Aa9$—$Ai1$.

In tempo seven the multiple contact switch set T7 is only composed by sets like 86, and the registered numbers in the registers $Aa9$—$Ai1$, $Aj9$—$Ar1$ and $As9$—$Aae1$ are transferred to the box and accumulated. As 0 is not inserted, all the addition units will take the 0 position, while at the same time the set T7 is being cut off from power supply.

For the purpose of performing one multiplication and three balancing processes thereby supplying impulses for the registering of the product of the three resulting balances, the driving shaft 1, Fig. 1, has rotated seven times.

In Fig. 9 the predetermined operation series is shown performed by means of an example comprising arbitrarily chosen numbers and the calculation made according to the illustrations in Figs. 10a and 10b.

The predetermined operation series perform the following calculations: $a \cdot b = c$; $(d+c)$; $(e-c)$; $(c+f)$. The letters indicate numbers having several ciphers, of which the numbers $a$, $b$, $d$, $e$ and $f$ are transferred from the box. The results: $c=R1$; $d+c=R2$; $e-c=R3$; $c+f=R4$ are transferred to the box.

If the numbers $276.53=a$; $4368=b$; $1.244.799.23=d$; $2.176.988.96=e$; $214.25=f$, the calculations indicated in the Fig. 9 will take place. The calculations have been made according to Figs. 10a and 10b, only the numerical values of the various relay units having been stated in accordance with the relays across which a power circuit has been closed. The numerical value is not registered until in the following tempo.

Having now described my invention it will be understood this is not limited to the specific form or character of the reinforcement herein shown and described, but what I claim as my invention is:

I claim:

1. In an electrical calculating machine, a plurality of sets of switch contacts in each of a plurality of decimal orders, an operating bar for each set of switch contacts, result indicating leads connected to indicating means, a current source, an electrical network connecting said current source to said result indicating leads through said sets of switch contacts, and means for selectively actuating said operating bars in accordance with the numerical values 1, 2, 4, 6 and 8 respectively; said means including a motor-driven shaft and eccentric, notched slide bars reciprocated by said eccentric adjacent each switch-operating bar, a hook pivoted to each switch-operating bar and movable into and out of coupling engagement in a notch of the associated slide bar, and magnets having armatures for moving the hooks of the associated switch-operating bar into coupling engagement with a slide bar on energization of the magnet.

2. In an electrical calculating machine, the invention as recited in claim 1, in combination with means including a switch closed by said shaft during a portion of each rotation thereof for completing a holding circuit for each magnet on energization thereof.

3. In an electrical calculating machine, the invention as recited in claim 1, in combination with a tens-transfer relay for transmitting the value 1 between sets of switch contacts of successive decimal orders.

References Cited in the file of this patent

UNITED STATES PATENTS

| | | |
|---|---|---|
| 1,863,097 | Borel | June 14, 1932 |
| 1,916,624 | Mansel | July 4, 1933 |
| 1,944,692 | Maby | Jan. 23, 1934 |
| 2,067,157 | Maul | Jan. 5, 1937 |
| 2,318,591 | Couffignal | May 11, 1943 |
| 2,370,989 | Nichols | Mar. 6, 1945 |
| 2,394,924 | Luhn | Feb. 2, 1946 |
| 2,486,809 | Stibitz | Nov. 1, 1949 |
| 2,552,760 | Baker | May 15, 1951 |